United States Patent
Chedeau et al.

(10) Patent No.: US 10,380,774 B2
(45) Date of Patent: Aug. 13, 2019

(54) RENDERING CONTIGUOUS IMAGE ELEMENTS

(71) Applicant: Facebook, Inc., Menlo Park, CA (US)

(72) Inventors: Christopher Serge Benjamin Chedeau, Redwood City, CA (US); Andrew Chung, San Francisco, CA (US); Emily B. Grewal, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 187 days.

(21) Appl. No.: 13/715,636

(22) Filed: Dec. 14, 2012

(65) Prior Publication Data

US 2014/0168272 A1 Jun. 19, 2014

(51) Int. Cl.
| | |
|---|---|
| G06T 11/60 | (2006.01) |
| G06T 3/40 | (2006.01) |
| G06T 3/20 | (2006.01) |
| G06T 9/40 | (2006.01) |
| G06F 3/0481 | (2013.01) |
| G06Q 50/00 | (2012.01) |
| H04N 1/00 | (2006.01) |
| G06F 16/904 | (2019.01) |

(52) U.S. Cl.
CPC ............ *G06T 11/60* (2013.01); *G06F 3/0481* (2013.01); *G06F 16/904* (2019.01); *G06Q 50/01* (2013.01); *G06T 3/20* (2013.01); *G06T 3/40* (2013.01); *G06T 9/40* (2013.01); *H04N 1/00196* (2013.01); *H04N 1/00453* (2013.01); *G06T 2207/20072* (2013.01)

(58) Field of Classification Search
CPC ..... G06T 11/001; G06T 11/60; G06T 7/0042; G06T 3/0093; G06T 3/40; G06T 3/20; G06T 3/4038; G06T 2207/20072; G06G 2340/0407; G02B 5/3083; G06F 3/0485; G06F 3/0481; G06F 9/4443; G06F 16/904; G06K 9/32; G09G 2340/0407; G06Q 50/01; H04N 1/00196; H04N 1/00453
USPC ......... 345/581, 619, 642, 660–682; 382/291, 382/293, 295, 298–300, 305; 715/764, 715/765, 769, 781, 788, 799, 800
See application file for complete search history.

(56) References Cited

U.S. PATENT DOCUMENTS

2013/0013667 A1* 1/2013 Serena .......................... 709/203
2013/0238964 A1* 9/2013 Perrodin et al. ............. 715/209

* cited by examiner

*Primary Examiner* — Ke Xiao
*Assistant Examiner* — Andrew Shin
(74) *Attorney, Agent, or Firm* — Baker Botts L.L.P.

(57) ABSTRACT

In one embodiment, a method includes determining a sequence of image elements. For each image element in the sequence, a position in an array of contiguous image elements is determined. The position may be based on several factors, including at least: a size of the image element (large or small), an order of the image element in the sequence, and dimensions of the display array. The array of image elements may be rendered for display to the user such that the layout of the image elements is contiguous. If the user provides input re-sizing an image element or re-ordering the sequence of image elements, the array may be re-rendered.

20 Claims, 7 Drawing Sheets

RENDERING CONTIGUOUS IMAGE ELEMENTS

TECHNICAL FIELD

This disclosure generally relates to rendering a display of an array of contiguous image elements.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments comprise rendering an array of contiguous image elements. Image elements are placed into an array that may be constrained in one dimension and vary in the other dimension. Image elements may be one of two sizes, wherein the larger size is a two-dimensional multiple of N times the smaller size. A sequence of image elements may be placed into the array in iterations along the constrained dimension. Image elements of the smaller size may be placed into the array in groups of N image elements. If a larger image element appears in the middle of a group of smaller image elements in the sequence of image elements, placement of image elements may be adjusted as the display is rendered so as to preserve the contiguous layout. If user input is received that changes the size of a selected image element or changes the order of image elements in the sequence, the display may be re-rendered to ensure an array of contiguous image elements in accordance with the order of image elements in the sequence.

DESCRIPTION OF EXAMPLE EMBODIMENTS

Particular embodiments comprise rendering an array of contiguous image elements based on a sequence of the image elements. Image elements are placed into an array that may be constrained in one dimension and vary in the other dimension. Image elements may be one of two sizes, wherein the larger size ($S_{large}$) is a two-dimensional multiple of N times the smaller size ($S_{small}$), such that $S_{large}=S_{small}^N$. A rendering algorithm may determine placement of image elements into the array. A sequence of image elements may be placed into the array in iterations along the constrained dimension. In particular embodiments, the width of each column of the array may be set to the width of the large image element, which may be equal to a multiple N of the width of the small image element. Image elements of the smaller size may be placed into the array in groups of N image elements. If a larger image element appears in the middle of a group of smaller image elements in the sequence of image elements, the rendering algorithm may choose to place the larger image element first, or to place a complete group of smaller image elements first, so as to preserve the contiguous layout. If user input is received that changes the size of a selected image element or changes the order of image elements in the sequence, the display may be re-rendered to ensure an array of contiguous image elements in accordance with the order of image elements in the sequence.

An image element may comprise an image of any type of visual content, such as, by way of example and not limitation, a picture, a video frame, a video, a map, a text block, a page of a document, a screenshot, or any thumbnail image representation. The sequence of image elements may comprise any type or combination of types of image elements. The order of image elements in the sequence may be determined in any manner.

FIGS. 1A-D illustrate example displays of an array of contiguous image elements. More particularly, FIGS. 1A-D illustrate changes to an example display of an array of contiguous image elements based on a sequence of image elements, the changes being triggered by user input. In the example displays illustrated in FIGS. 1A-D, image elements are placed into an array that is constrained to a definite number of columns (three) and may vary in the number of rows. Image elements are one of two sizes, wherein the larger size is a two-dimensional multiple of two times the smaller size (therefore $S_{large}=S_{small}^2$). Image elements may be placed into the array in accordance with the sequence in iterations along the constrained dimension (so that the first row is filled, and then the second row, and so on and so forth). Image elements of the smaller size are placed into the array in groups of two image elements.

Figure 1A:
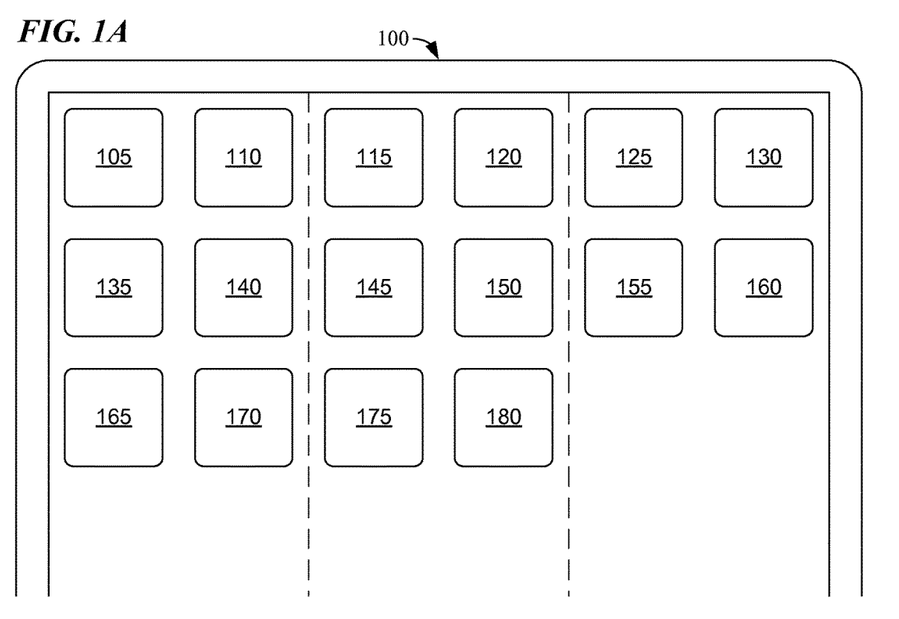
FIGS. 1A-D illustrate example displays of an array of contiguous image elements.

FIG. 1A illustrates an example display comprising an initial array of contiguous image elements in accordance with a sequence of image elements. The sequence of image elements initially includes images that are all of a uniform (the smaller) size, and so image elements are placed into the array in accordance with the sequence in groups of two:

the first row including the group of image elements 105 and 110 in the first column, the group of image elements 115 and 120 in the second column, and the group of image elements 125 and 130 in the third column;

the second row including the group of image elements 135 and 140 in the first column, the group of image elements 145 and 150 in the second column, and the group of image elements 155 and 160 in the third column; and the third row including the group of image elements 165 and 170 in the first column, the group of image elements 175 and 180 in the second column, and no image elements in the third column.

Figure 1B:
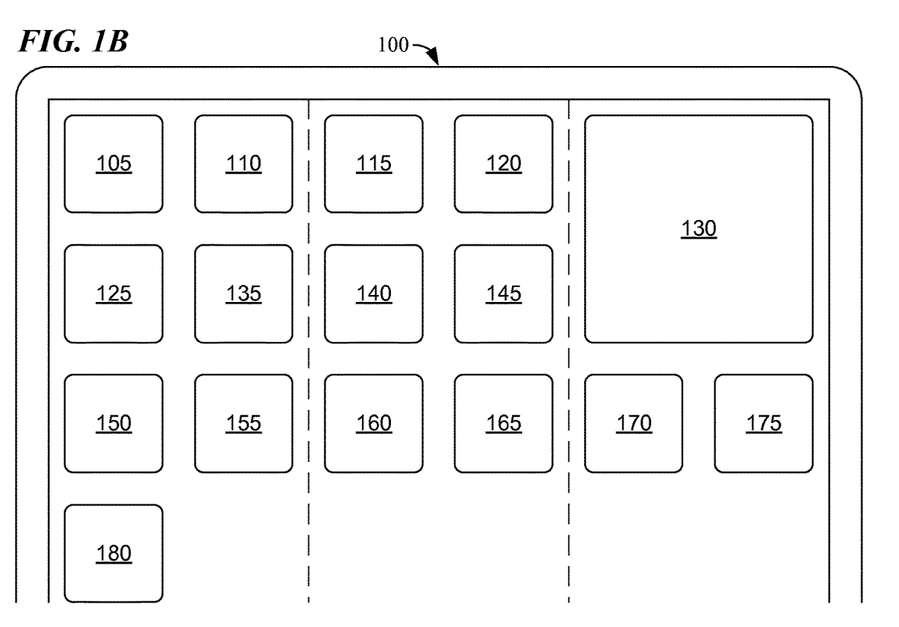

FIG. 1B illustrates an updated array of contiguous image elements in accordance with the sequence of image elements, after having received user input enlarging the size of image element 130. The image elements are placed into the array in accordance with the sequence:

the first row including the group of image elements 105 and 110 in the first column, the group of image elements 115 and 120 in the second column, and enlarged image element 130 in the first and second rows of the third column—in the example layouts illustrated in FIGS. 1A-D, when the rendering algorithm detects enlarged image element 130 in the middle of a group of smaller-sized image elements (125 and 135), the rendering algorithm selects image element 130 for placement first;

the second row including the group of image elements 125 and 135 in the first column, the group of image elements 140 and 145 in the second column, and enlarged image element 130 occupying the third column;

the third row including the group of image elements 150 and 155 in the first column, the group of image elements 160 and 165 in the second column, and the group of image elements 170 and 175 in the third column; and the fourth row including a single smaller-sized image element 180 (since that is the last image element in the sequence.

Figure 1C:
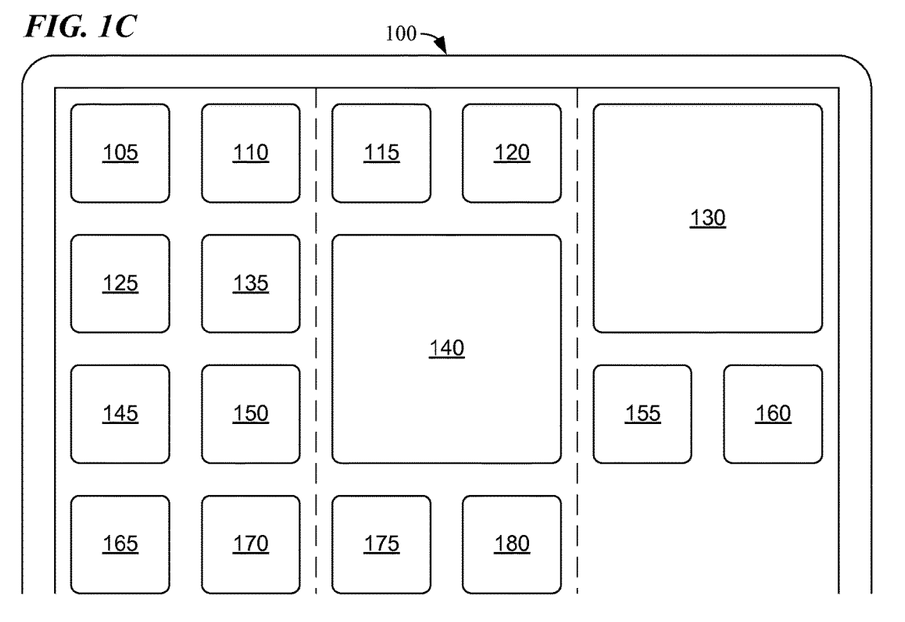

FIG. 1C illustrates an updated array of contiguous image elements in accordance with the sequence of image elements, after having received user input enlarging the size of image element 140. The image elements are placed into the grid in accordance with the sequence:

the first row including the group of image elements 105 and 110 in the first column, the group of image elements 115 and 120 in the second column, and enlarged image element 130 in the first and second rows of the third column;

the second row including the group of image elements 125 and 135 in the first column, enlarged image element 140 in the second column, and enlarged image element 130 occupying the third column;

the third row including the group of image elements 145 and 150 in the first column, enlarged image element 140 in the second column, and the group of image elements 155 and 160 in the third column; and the fourth row including the group of image elements 165 and 170 in the first column, and the group of image elements 175 and 180 in the second column.

Figure 1D:
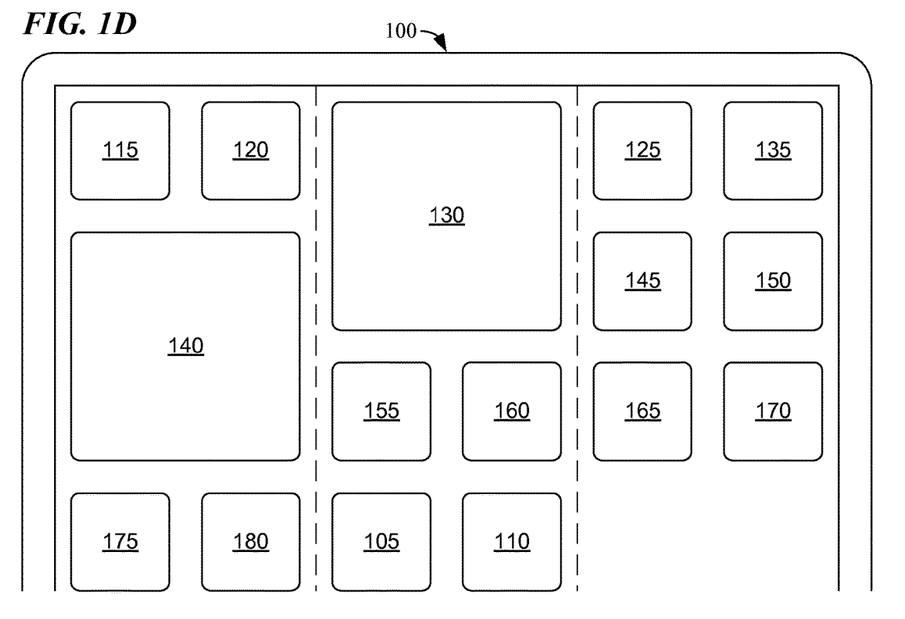

FIG. 1D illustrates an updated array of contiguous image elements in accordance with the sequence of image elements, after having received user input changing the order of image elements in the sequence to place image elements 105 and 110 at the end of the sequence. The image elements are placed into the array in accordance with the newly-ordered sequence:

the first row including the group of image elements 115 and 120 in the first column, enlarged image element 130 in the first and second rows of the second column, and the group of image elements 125 and 135 in the second column;

the second row including enlarged image element 140 in the first column, enlarged image element 130 occupying the second column, and the group of image elements 145 and 150 in the third column;

the third row including the enlarged image element 140 in the second column, the group of image elements 155 and 160 in the first column, and the group of image elements 165 and 170 in the third column; and the fourth row including the group of image elements 175 and 180 in the first column, and the group of image elements 105 and 110 in the second column.

As can be seen in FIGS. 1A-D, the array of contiguous image elements is preserved in each case, without any gaps in the layout, despite changes in the size and order of image elements in the layout. Example pseudo-code is presented below for an example embodiment of a rendering algorithm, as illustrated in FIGS. 1A-D:

```
int groupUnit = 2;
int col;
sequence Elements;
element image;
array Display [3,0];
queue Stash;
while (image = Elements.getNext( ))
{
    if (image.size( ) == Large)
    {
        col = Display.getShortestColumn( ); /* where col is 1, 2, or 3 */
        Display[col].allocate(groupUnit);
        Display[col].append(image);
    }
    else Stash.add(image);
    if (Stash.size( ) ≥ groupUnit)
    {
        col = Display.getShortestColumn( ); /* where col is 1, 2, or 3 */
        Display[col].allocate(1);
        Display[col].append(Stash.extract(groupUnit));
    }
}
if (Stash.notEmpty( ))
{
    col = Display.getShortestColumn( ); /* where col is 1, 2, or 3 */
    Display[col].allocate(Stash.size( ));
    Display[col].append(Small, Stash.extractAll( ));
}
```

Figure 2A:
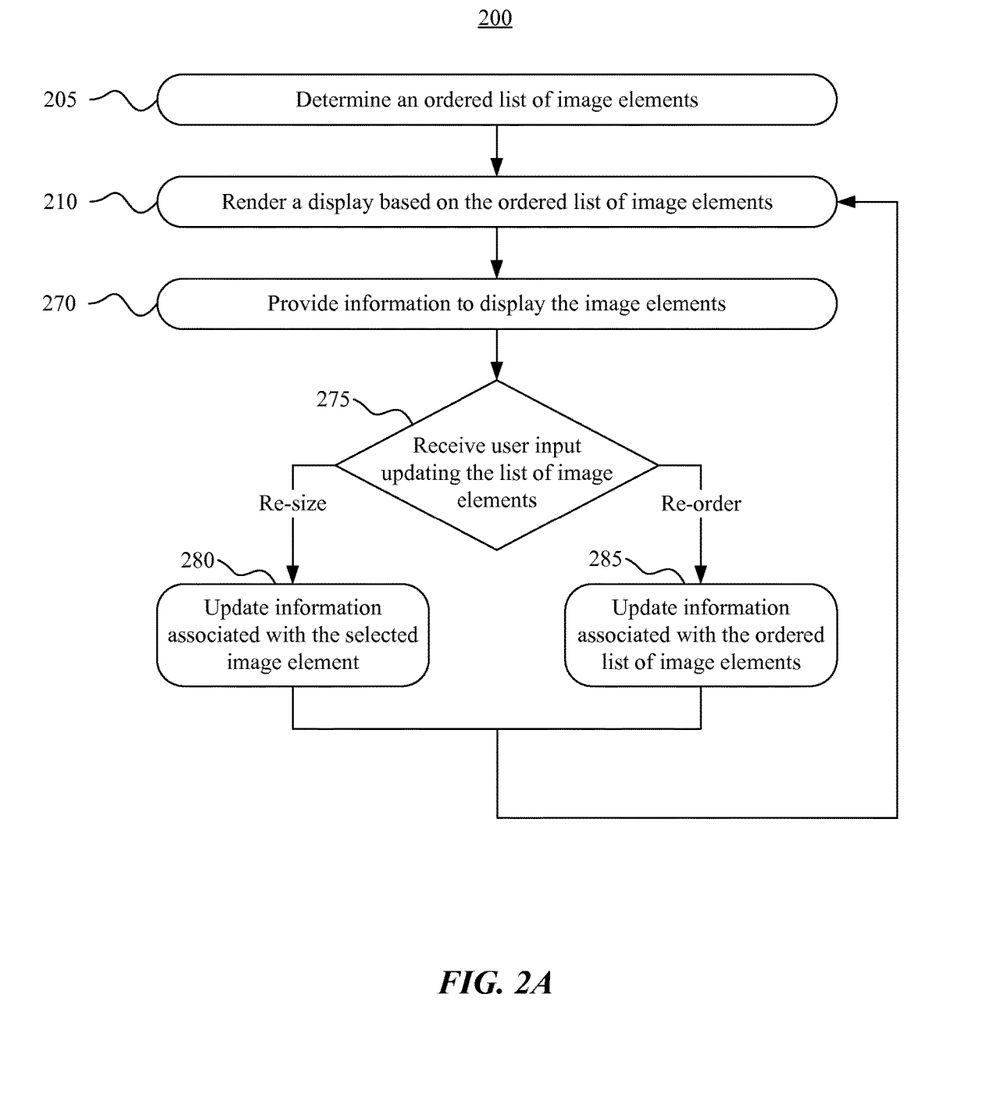
FIGS. 2A-B illustrate example flowcharts of a method for rendering a display of image elements in an array of contiguous image elements.
Figure 2B:
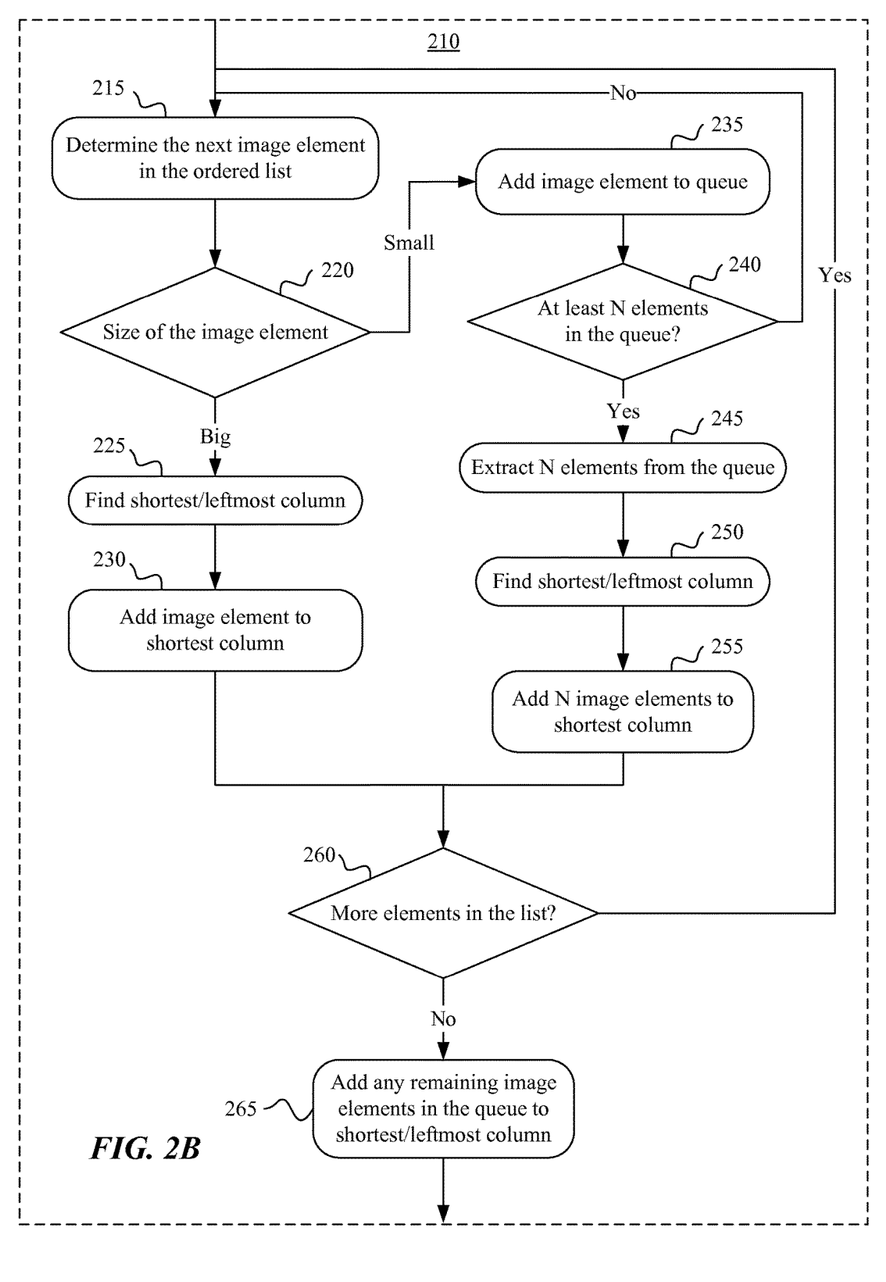

FIGS. 2A-B illustrate example flowcharts of a method 200 for rendering an array of contiguous image elements. FIG. 2A illustrates the high-level flow of steps in the method. FIG. 2B illustrates the steps involved in rendering the display of image elements. In step 205, a sequence of image elements may be determined. The sequence of image elements may be assembled in any manner. In particular embodiments the sequence of image elements may comprise images and other content associated with a node of a social graph associated with a social-networking system.

In step 210, an array of contiguous image elements may be rendered based on the sequence of image elements. Step 210 is described in further detail in FIG. 2B (and in steps 215-265). In step 215, the next image element in the sequence is determined. This step may comprise determining the next image element in accordance with the order of the list. In step 220, the size of the image element is assessed. The rendering algorithm may handle smaller- and larger-sized image elements in a different fashion. In the examples described in FIGS. 1A-D and example method 200, placement preference is given to larger image elements; however, this disclosure anticipates placement preference for smaller image elements as well. If the image element is determined to be of the larger size, the method proceeds through steps 225 to 230, and then jumps to step 260. If the image element is determined to be of the smaller size, the method proceeds through steps 235 to 255, and then to step 260.

In step 225, the rendering algorithm finds the shortest- and/or left-most-available column in the display. For example, when the layout for the display shown in FIG. 1B was generated, large image element 130 was placed into the third column because it was the "shortest-available" column at that time (i.e., the first and second columns were already populated with one row of image elements each, whereas the third column had none). Subsequently, the grouping of small image elements 125 and 135 was placed into the first column (rather than the second column), because although the first and second columns both qualified as the "shortest-available" columns at that moment, the first column was the "left-most-available" column of the two. Embodiments focused on an array that is constrained in the number of rows may look for the shortest and/or upper-most row. Embodiments anticipate any method of prioritizing where an image should be placed next in the array. In step 230, the rendering algorithm appends the large image element to the shortest column. By doing so, the length of the column is increased by the length of the related dimension of the large image element, which comprises a multiple N of the length of the related dimension of the small image element. In addition, the entire width of the column may be occupied by the large image element, which comprises a multiple N of the width of the related dimension of the small image element.

In step 235, the small image element is added to a queue for temporary storage (until a group of N small image elements has been collected). The queue may be a first-in, first-out (FIFO) queue so as to preserve the order of the image elements. In step 240, the queue is assessed to determine whether there are at least N small image elements in the queue. If not, the rendering algorithm will return to step 215 to get the next image element in the sequence. If there are at least N small image elements in the queue, a group of N small image elements will be extracted from the queue (step 245). In step 250, the rendering algorithm finds the shortest and/or left-most column in the display. Embodiments focused on an array that is constrained in the number of rows may look for the shortest and/or upper-most row. Embodiments anticipate any method of prioritizing where an image should be placed next in the array. In step 255, the rendering algorithm appends the extracted group of N small image elements to the shortest column. By doing so, the length of the column is increased by the length of the related dimension of the small image element. In addition, the entire width of the column may be occupied by the group of N small image elements.

In step 260, the rendering algorithm assesses the sequence to determine if there are more elements remaining in the list to be placed into the array. If yes, the rendering algorithm will return to step 215 to get the next image element in the sequence. If there are no more elements in the list, the rendering algorithm inspects the queue to add any remaining small image elements in the queue into the array (step 265).

In step 270, the array of contiguous image elements is provided for display to a user. User input updating the display may be received (step 275). If the user input comprises a re-size of one or more selected image elements, information associated with the one or more selected image elements may be updated accordingly (step 280). For example, metadata associated with the selected image elements may be updated (to change the size from small to large or vice versa) and stored in association with the respective selected image elements. If the user input comprises a re-ordering of the image elements, information associated with the sequence of image elements may be updated accordingly (step 285).

After such input is received, the method may return to step 210 to re-render the array. In particular embodiments, the rendering algorithm may only re-determine the position of image elements in the sequence for as many image elements as needed. For example, the re-determination may begin with the first image element in the same row (when the array is constrained to a defined row length) or column (when the array is constrained to a defined column length) as the first image element that was affected by the user input.

In particular embodiments, determination of images may comprise retrieving or requesting images from one or more local data stores, from one or more remote data stores, from one or more databases, from one or more third-party servers, or by accessing one or more APIs. In particular embodiments, retrieval of images may comprise generating screenshots, generating thumbnails, extracting video frames, cropping images, scaling images, converting images from one format to another (e.g., vector to raster, or Portable Networking Graphics (PNG) to Joint Photographic Experts Group (JPEG)).

The set of images in the sequence may include images from a social-networking system. Such images may include images associated with the viewer, images associated with other users connected to the viewer in a social graph (which may be limited to users connected to the viewer within a particular degree of separation, users within a particular group or organization, users sharing particular interests or affinities with the viewer, or users having a similar profile as the user or a target demographic profile) or images associated with particular users or concepts that the viewer is following. Example embodiments of a social graph are described in further detail with respect to FIG. 3. Example embodiments of a social-networking system are described in further detail with respect to FIG. 4.

The set of images in the sequence may include a set of captured images of online content. In particular embodiments, an image may represent a screenshot of a website, a portion of a website, or a screenshot of some other type of online content. For example, images may include screenshots of current news stories for topics, companies, politicians, or celebrities that the user is following. Upon clicking on the image, the viewer may be taken to the website for the screenshot. Such captured images may be generated by a web crawler or received from third-party servers.

Images may be selected according to relevance to the user, user preferences, or other factors. In particular embodiments, images may be selected in accordance with social-networking information. A social-networking system may have determine a relevance score for an image based at least in part on a connection value for the image. As an example and not by way of limitation, a number of people depicted in the image who are associated with user nodes connected to the viewer in the social graph may affect the connection value. As an example and not by way of limitation, a degree of separation between user nodes of the social graph and the viewer may affect the connection value. As another example, the type of connection between the viewer and the user nodes of the social graph user may affect the connection value. As an example and not by way of limitation, "friendship"-type connections may be associated with a higher connection value than a "work colleague"-type connection.

A social-networking system may determine a relevance score for an image based at least in part on an interest value for the image. The interest value may be based at least in part on whether a category or categories assigned to the image coincide with the category or categories associated with the viewer's interests. The interest value may be based at least in part on whether a category or categories assigned to people, locations, objects, or actions depicted in the image coincide with the category or categories associated with the viewer's interests. The interest value may be based at least in part on whether a category or categories assigned to social-networking information, third-party information, or metadata associated with the image coincide with the category or categories associated with the viewer's interests.

As an example and not by way of limitation, an object in the social graph may include a user or concept profile, or information associated with a user node that is connected to the user. As another example, an action may include friending/unfriending a user node, "liking" a content object, becoming a fan of a third party, joining a group or community of users on social-networking system 160, or visiting a website of a third party. As another example, third-party information may include information of activity of the user or purchases by the user on a third-party website.

Determination of relevance scores is discussed in further detail in U.S. patent application Ser. No. 12/976,859, filed 22 Dec. 2010 and titled "Timing for Providing Relevant Notifications for a User Based on User Interaction with Notifications," which is incorporated herein by reference.

The relevance score may be based at least in part to an affinity for the user with respect to the object of the social graph, as described above. As an example and not by way of limitation, affinity for past, present, or future content may be determined by the processing module of the content engine based on user activities, activities of the user nodes of the social graph, or associated connections, or any combination thereof. Affinity may be calculated using a weighted set of predictor functions. Predictor functions predict whether the user will perform a particular action. The predictor functions may predict any number of actions, which may be within or outside of the social networking system. Any type of variable may be considered when determining affinity to weight the aggregated consolidated data. Determination and use of measures of affinity are discussed in further detail in the following U.S. patent applications, all of which are incorporated herein by reference: U.S. patent application Ser. No. 11/502,757, filed on 11 Aug. 2006, titled "Generating a Feed of Stories Personalized for Members of a Social Network," and issued as U.S. Pat. No. 7,827,208; U.S. patent application Ser. No. 12/645,481, filed on 23 Dec. 2009 and titled "Selection and Presentation of Related Social Networking System Content and Advertisements;" U.S. patent application Ser. No. 13/247,825, filed on 28 Sep. 2011 and titled "Instantaneous Recommendation of Social Interactions in a Social Networking System;" U.S. patent application Ser. No. 12/976,755, filed on 22 Dec. 2010 and titled "Pricing Relevant Notifications Provided to a User Based on Location and Social Information;" U.S. patent application Ser. No. 12/978,265, filed on 23 Dec. 2010 and titled "Contextually Relevant Affinity Prediction in a Social Networking System;" and U.S. patent application Ser. No. 13/632,869, filed on 1 Oct. 2012 and titled "Mobile Device-Related Measures of Affinity."

In particular embodiments, the steps of method 200 may be performed on a computer server, which sends either just the information to create the array of contiguous image elements, or sends the actual array of contiguous image elements (including the image elements themselves. In particular embodiments, the steps of method 200 may be performed on a user's computing device. In such embodiments, when the user wants to insert or update images in the sequence, the user may send a request to one or more computer servers for one or more image elements, insert the one or more image elements into the sequence, and re-determine the array of contiguous image elements.

Figure 3:
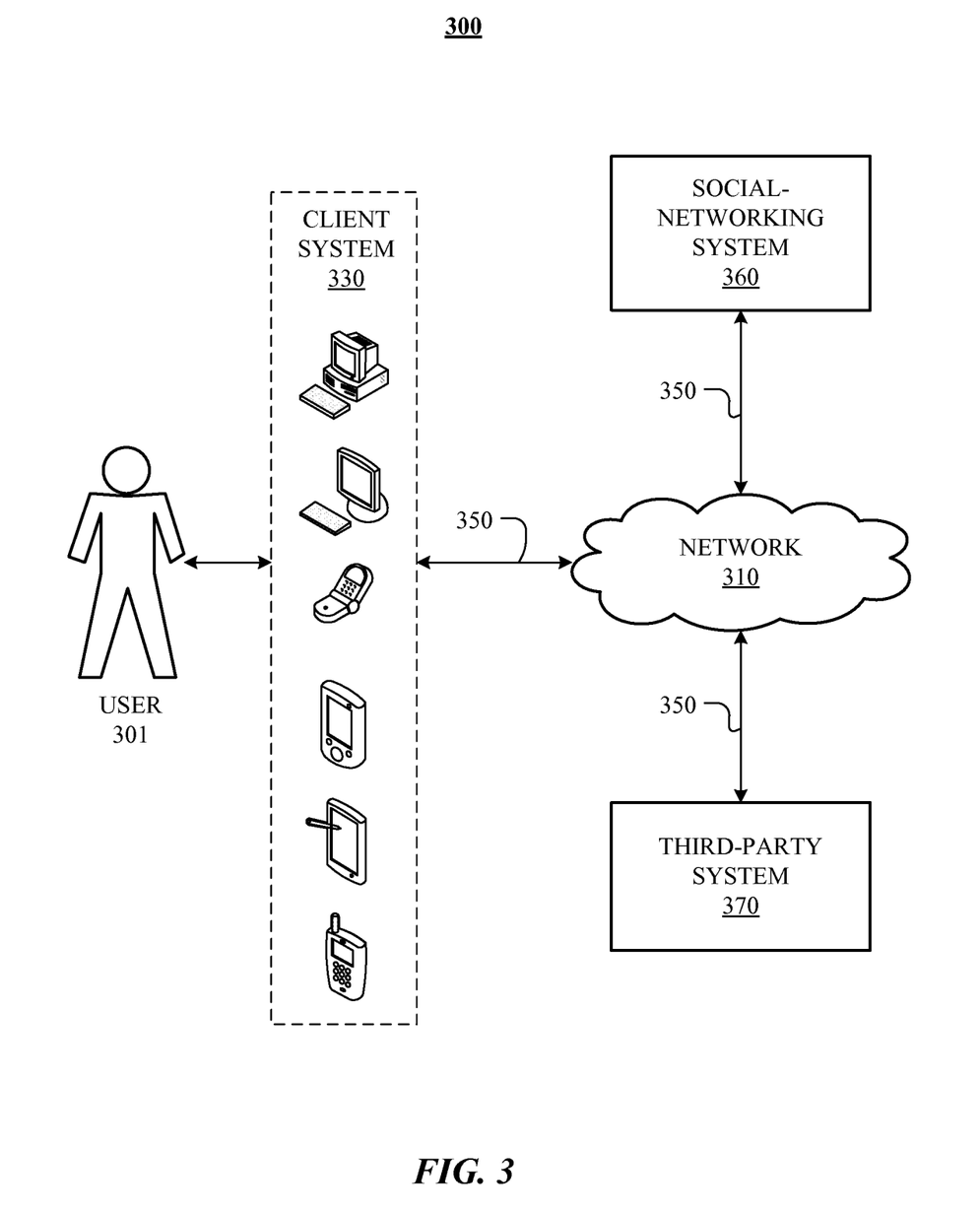
FIG. 3 illustrates an example network environment associated with a social-networking system.

FIG. 3 illustrates an example network environment 300 associated with a social-networking system. Network environment 300 includes a user 301, a client system 330, a social-networking system 360, and a third-party system 370 connected to each other by a network 310. Although FIG. 3 illustrates a particular arrangement of user 301, client system 330, social-networking system 360, third-party system 370, and network 310, this disclosure contemplates any suitable arrangement of user 301, client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of users 301, client systems 330, social-networking systems 360, third-party systems 370, and networks 310, this disclosure contemplates any suitable number of users 301, client systems 330, social-networking systems 360, third-party systems 370, and networks 310. As an example and not by way of limitation, network environment 300 may include multiple users 301, client system 330, social-networking systems 360, third-party systems 370, and networks 310.

In particular embodiments, user 301 may be an individual (human user), an entity (e.g., an enterprise, business, or third-party application), or a group (e.g., of individuals or entities) that interacts or communicates with or over social-networking system 360. In particular embodiments, social-networking system 360 may be a network-addressable computing system hosting an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. In particular embodiments, social-networking system 360 may include an authorization server that allows users 301 to opt in or opt out of having their actions logged by social-networking system 360 or shared with other systems (e.g., third-party systems 370), such as, for example, by setting appropriate privacy settings. In particular embodiments, third-party system 370 may be a network-addressable computing system that can host content servers. Third-party system 370 may generate, store, receive, and send content, including multimedia content, such as, for example, images, video, text, websites, interactive content, live streaming content, etc. Third-party system 370 may be accessed by the other components of network environment 300 either directly or via network 310. In particular embodiments, one or more users 301 may use one or more client systems 330 to access, send data to, and receive data from social-networking system 360 or third-party system 370. Client system 330 may access social-networking system 360 or third-party system 370 directly, via network 310, or via a third-party system. As an example and not by way of limitation, client system 330 may access third-party system 370 via social-networking system 360.

Client system 330 may be any suitable computing device, such as, for example, a personal computer, a laptop computer, a cellular telephone, a smartphone, or a tablet computer.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

Figure 4:
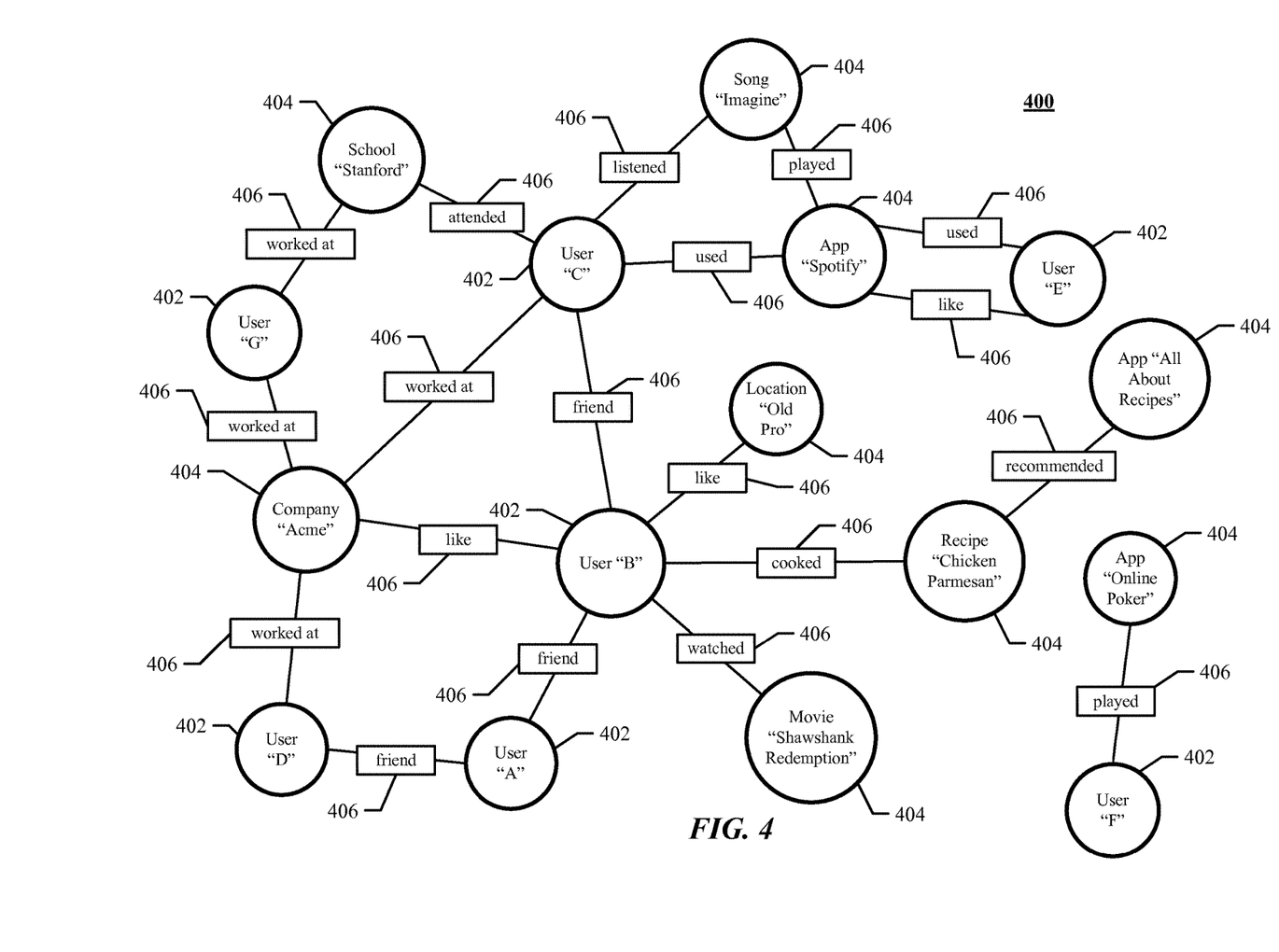
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party server 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 330 to send to social-networking system 360 a message indicating the user's action. In response to the message, social-networking system 360 may create an edge (e.g., an "eat" edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 24. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to a edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Figure 5:
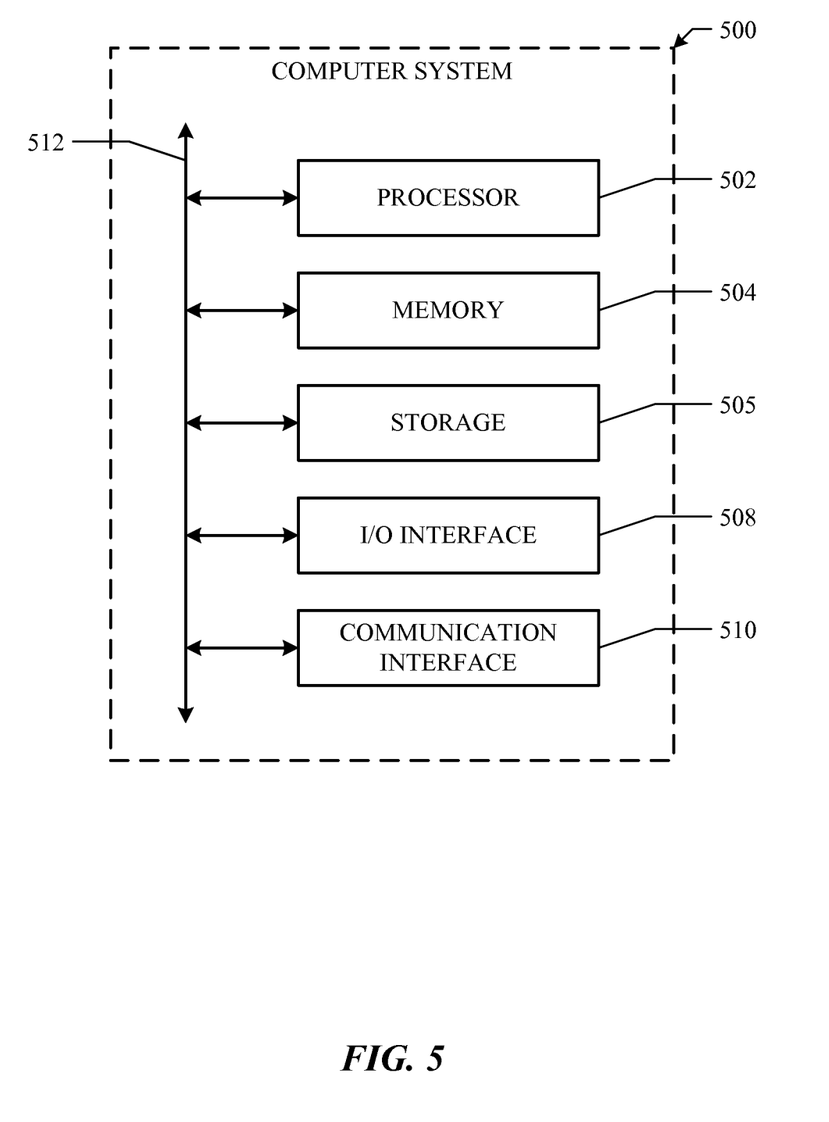
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, determining a sequence of image elements;
   by the computing device, determining, for each image element in the sequence, a first position in an array of contiguous image elements, the first position being based on a size of the image element, an order of the image element in the sequence, and dimensions of the array;
   by a computing device, determining, in response to an instruction to adjust the position or size of a first image element, a second position in the array for at least one second image element, the second position determined based on a rule requiring the image elements to be contiguous such that each available image position between the first image element in the sequence and the last image element in the sequence is occupied by an image element; and by the computing device, providing information to render the array of contiguous image elements.

2. The method of claim 1, wherein at least one of the image elements comprises a picture, a map, a story block of text, a page of a document, an icon, or any thumbnail image, or any combination thereof.

3. The method of claim 1, wherein the array is constrained in a first dimension and varies in a second dimension.

4. The method of claim 1, wherein each of the image elements is presented in one of two sizes, and wherein a larger of the two sizes is a two-dimensional multiple of the smaller of the two sizes.

5. The method of claim 1, further comprising:
receiving user input adjusting an order of the image elements in the sequence; and
determining, for one or more image elements in the sequence, a third position in the array of contiguous image elements.

6. The method of claim 1, wherein the order of the image elements in the sequence is based on a relevance of each of the image elements to a user of a social-networking system.

7. The method of claim 6, wherein the relevance is based on one or more of:
a connection value of the image for the user; or
an interest value of the image for the user.

8. The method of claim 6, wherein the social-networking system comprises a social graph comprising a plurality of nodes and a plurality of edges connecting the node, at least one first node corresponding to the user, each of the image elements corresponding to one or more data objects associated with at least one of the nodes; and
the relevance of each image element is based at least in part on an affinity of the user with respect to at least one of the one or more data objects corresponding to that image element.

9. The method of claim 1, wherein the instruction is based on a user input.

10. The method of claim 1, wherein the computing device is associated with a user, wherein the determining a sequence of image elements comprises:
sending a request to one or more computer servers for one or more image elements;
receiving the one or more image elements;
inserting the one or more image elements into the sequence; and
determining, for each of the one or more image elements, a respective position in the array of contiguous image elements.

11. The method of claim 1, wherein the providing the information to render the array of contiguous image elements comprises:
sending the information to a computing device associated with a user, wherein the information comprises layout information for each of the contiguous image elements in the array.

12. One or more computer-readable non-transitory storage media embodying software that is operable when executed to:
determine a sequence of image elements;
determine, for each image element in the sequence, a first position in an array of contiguous image elements, the first position being based on a size of the image element, an order of the image element in the sequence, and dimensions of the array;
determine, in response to an instruction to adjust the position or size of a first image element, a second position in the array for at least one second image element, the second position determined based on a rule requiring the image elements to be contiguous such that each available image position between the first image element in the sequence and the last image element in the sequence is occupied by an image element; and
provide information to render the array of contiguous image elements.

13. The media of claim 12, wherein at least one of the image elements comprises a picture, a map, a story block of text, a page of a document, an icon, or any thumbnail image, or any combination thereof.

14. The media of claim 12, wherein each of the image elements is presented in one of two sizes, and wherein a larger of the two sizes is a two-dimensional multiple of the smaller of the two sizes.

15. The media of claim 12, wherein the order of the image elements in the sequence is based on a relevance of each of the image elements to a user of a social-networking system.

16. A system comprising:
one or more processors; and
a memory coupled to the processors comprising instructions executable by the processors, the processors being operable when executing the instructions to:
determine a sequence of image elements;
determine, for each image element in the sequence, a position in an array of contiguous image elements, the position being based on a size of the image element, an order of the image element in the sequence, and dimensions of the array;
determine, in response to an instruction to adjust the position or size of a first image element, a second position in the array for at least one second image element, the second position determined based on a rule requiring the image elements to be contiguous such that each available image position between the first image element in the sequence and the last image element in the sequence is occupied by an image element; and
provide information to render the array of contiguous image elements.

17. The system of claim 16, wherein at least one of the image elements comprises a picture, a map, a story block of text, a page of a document, an icon, or any thumbnail image, or any combination thereof.

18. The system of claim 16, wherein each of the image elements is presented in one of two sizes, and wherein a larger of the two sizes is a two-dimensional multiple of the smaller of the two sizes.

19. The system of claim 16, wherein the order of the image elements in the sequence is based on a relevance of each of the image elements to a user of a social-networking system.

20. The system of claim 16, wherein the computing device is associated with a user, and wherein the processors are further operable when executing the instructions to determine a sequence of image elements to:
send a request to one or more computer servers for one or more image elements;
receive the one or more image elements;
insert the one or more image elements into the sequence; and determine, for each of the one or more image elements, a respective position in the array of contiguous image elements.

* * * * *